(12) United States Patent
Burchett et al.

(10) Patent No.: US 8,341,404 B2
(45) Date of Patent: Dec. 25, 2012

(54) SYSTEM AND METHOD FOR INTELLIGENCE BASED SECURITY

(75) Inventors: Christopher D. Burchett, Lewisville, TX (US); Jason Jaynes, Austin, TX (US); Bryan Chin, Plano, TX (US); David Consolver, Arlington, TX (US)

(73) Assignee: Credant Technologies, Inc., Addison, TX (US)

( * ) Notice: Subject to any disclaimer, the term of this patent is extended or adjusted under 35 U.S.C. 154(b) by 1643 days.

(21) Appl. No.: 11/357,448

(22) Filed: Feb. 17, 2006

(65) Prior Publication Data

US 2007/0174909 A1 Jul. 26, 2007

Related U.S. Application Data

(60) Provisional application No. 60/654,165, filed on Feb. 18, 2005, provisional application No. 60/736,930, filed on Nov. 15, 2005.

(51) Int. Cl.
*G06F 12/14* (2006.01)
*G06F 7/00* (2006.01)
*H04L 29/06* (2006.01)

(52) U.S. Cl. ............ 713/165; 713/167; 713/193; 726/6; 726/7; 726/18; 726/19; 726/27

(58) Field of Classification Search .............. 726/18, 726/19, 27, 5, 6, 7; 713/165, 167
See application file for complete search history.

(56) References Cited

U.S. PATENT DOCUMENTS

| | | | |
|---|---|---|---|
| 6,064,736 A * | 5/2000 | Davis et al. ................... 713/155 |
| 6,178,506 B1 | 1/2001 | Quick, Jr. | |
| 6,477,585 B1 * | 11/2002 | Cohen et al. .................. 719/318 |
| 6,633,981 B1 * | 10/2003 | Davis ............................ 713/189 |
| 6,789,195 B1 * | 9/2004 | Prihoda et al. ................ 713/182 |
| 6,931,382 B2 * | 8/2005 | Laage et al. ..................... 705/67 |
| 6,985,953 B1 * | 1/2006 | Sandhu et al. ................ 709/229 |
| 7,065,547 B2 * | 6/2006 | Persels et al. ................. 709/200 |
| 7,280,956 B2 * | 10/2007 | Cross et al. .................... 713/171 |
| 7,386,730 B2 * | 6/2008 | Uchikubo ....................... 713/182 |
| 7,406,596 B2 * | 7/2008 | Tararukhina et al. .......... 713/165 |
| 7,421,589 B2 * | 9/2008 | Williams et al. ............... 713/193 |
| 2002/0055942 A1 * | 5/2002 | Reynolds ....................... 707/200 |
| 2002/0124053 A1 | 9/2002 | Adams et al. | |
| 2003/0046562 A1 * | 3/2003 | Uchikubo ...................... 713/189 |
| 2004/0003285 A1 | 1/2004 | Whelan et al. | |

OTHER PUBLICATIONS

International Search Report and Written Opinion of the International Searching Authority from Patent Cooperation Treaty Application No. PCT/US2006/05816 dated May 13, 2008, pp. 1-12.

* cited by examiner

*Primary Examiner* — Philip Chea
*Assistant Examiner* — Fatoumata Traore
(74) *Attorney, Agent, or Firm* — Haynes and Boone, LLP (57) ABSTRACT

Included in the present disclosure are a system, method and program of instructions operable to protect vital information by combining information about a user and what they are allowed to see with information about essential files that need to be protected on an information handling system. Using intelligent security rules, essential information may be encrypted without encrypting the entire operating system or application files. According to aspects of the present disclosure, shared data, user data, temporary files, paging files, the password hash that is stored in the registry, and data stored on removable media may be protected.

21 Claims, 5 Drawing Sheets

SYSTEM AND METHOD FOR INTELLIGENCE BASED SECURITY

CROSS-REFERENCE TO RELATED APPLICATIONS

The present application claims priority to U.S. Provisional Patent Application No. 60/654,165, titled "System and Method for Intelligence Based Security," filed Feb. 18, 2005, and to U.S. Provisional Patent Application No. 60/736,930, titled "System and Method for Intelligent Encryption and Encryption Filtering," filed Nov. 15, 2005.

FIELD OF THE INVENTION

The present invention relates generally to data security and, more particularly, to a method and system for the intelligent encryption and encryption filtering of data.

BACKGROUND OF THE INVENTION

In a business world threatened by negligence, regulatory compliance, sabotage, corruption and terrorists, never has corporate data been more available and less secure. Certain industry groups estimate that through 2006, 90% of mobile devices containing business information will have insufficient power-on protection and stored data encryption to withstand casual to moderate hacker attacks.

Desktop and notebook personal computers, along with PDA's and smartphones, (collectively "devices") have become indispensable tools for business and home use. Notebooks and tablet PCs are popular business tools—approximately 55 million portable PCs will have been shipped in 2005 according to estimates. Consider that the vast amount of information on these devices is at risk in less than one minute, unless additional security measures beyond the standard Windows® login password are used.

Sensitive company and personal information is routinely stored on the hard disk drives within these devices. This sensitive information includes login information for banks and corporate systems as well as account numbers and other information necessary to use these systems. Storing such information on devices is necessary for the operation of business both in corporations and at home. However, the need to store this information creates a serious risk of identity theft if the device is lost or stolen and the information is not protected. For this reason, there is a significant need to protect the information stored on devices.

There are numerous public examples of notebooks and desktops being targeted for theft. For example, Wells Fargo alone had three separate incidents in one year where devices were stolen and information was potentially compromised—not to mention the damage done to their reputation and credibility by the publicity surrounding the thefts. Nearly 50% of the respondents to a 2004 industry study noted they had experienced lost or stolen laptops. While hardware is replaceable, a $1500 notebook can easily contain millions of dollars worth of sensitive information. In addition, regulations such as Calif. SB-1386, Gramm-Leach-Bliley, and HIPAA dictate fines for the exposure of certain sensitive information.

The expectations for protecting information stored on a PC are quite simple—ensure that only authorized users are permitted access to sensitive information stored on the device. Of course, there are vast amounts of data on a notebook or desktop hard disk drive that need not be protected because it does not contain sensitive information. Windows® operating system ("OS") and program files, for example, are binary files typically devoid of sensitive data. Encrypting these files—scrambling the information making it inaccessible to unauthorized users—can have catastrophic consequences. For example, corruption of an encrypted OS or program file can cause system instability and possibly prevent machine booting or user log-ins, hampering the productivity of remote or traveling employees. In addition, within corporations, there also exists a need to centrally manage the encryption parameters for a device because of the difficulty to physically access each device when encryption needs change.

SUMMARY OF THE INVENTION

In view of the foregoing, one embodiment of the present invention provides a method for securing an information handling system, comprising removing one or more user credentials from a customary storage location, storing the one or more user credentials in a secure location, the secure location separate from a customary user credential storage location and restoring the one or more user credentials to their customary location in response to an application call requiring access to the one or more user credentials, the user credentials restored to the customary location while in use.

An alternate embodiment of the present invention provides a program of instructions embodied in a computer readable medium implementing a method for securing data. According to teachings of the present invention, the program of instructions may implement a method comprising storing a representation of data used by one or more programs in a secure location, enabling removal of the representation from the secure location in response to a successful login, placing the representation in a program accessible area in response to an application call requesting access to data represented by the representation and removing the representation from the program accessible area when the data represented by the representation is not in use.

In a further embodiment, teachings of the present invention provide a system for securing data, comprising at least one processor, a memory operably associated with the at least one processor and a program of instructions storable in the memory and executable by the processor, the program of instructions including at least one instruction operable to apply one or more security measures to data identified by one or more of a pathname, data type, file type, file system owner, file system attributes and running process attributes and owner, maintain the one or more security measures applicable to data while the data is not in use and remove the one or more security measures from data in response to an authorized request for access to the data.

In a still further embodiment, teachings of the present invention provide a method for securing data, comprising dynamically updating one or more intelligent security rules, each rule including at least one qualifier and at least one attribute, maintaining the one or more intelligent security rules for use by an intelligent security filter operable to leverage the one or more intelligent security rules and encrypting data with the intelligent security filter in accordance with the one or more intelligent security rules in response to detection of a triggering file operation. Intelligent security rules may also specify which applications follow a set of intelligent security rules. In this way the intelligent security rules indicate both which data files are and are not protected, as well as, indicating applications which may write unprotected data from those which must always write protected data and those for which data protection follows a specific set of intelligent security rules.

In one aspect, the present invention may provide the advantage of enhancing data and device security while reducing or eliminating the need to change existing security system firmware or master boot records.

In another aspect, the present invention may provide the advantage of enabling the secure storage of all sensitive data within a computer system, regardless of its storage location or device.

In a further aspect, the present invention may provide the advantage of fine-grain control over the protection or encryption of data at rest as well as optimized performance and administrative ease.

In still another aspect, the present invention may provide the advantage of operating with complete transparency to an end-user and any applications in use on the system.

In yet another aspect, the present invention may provide the advantage of enabling protection and/or encryption policies to be changed at a server and to have those changes automatically applied to all devices in a corporate department, group or over the entire corporation.

In a still further aspect, the present invention may provide the advantage of enabling users to continue using a security and encryption enabled device seamlessly while protective measures are being installed or changed.

In yet another aspect, the present invention may provide the advantage of not requiring the operating system to be encrypted which may result in greater system performance and easier updates, patching, maintenance and administration of the device.

BRIEF DESCRIPTION OF THE DRAWINGS

A more complete understanding of the present embodiments and advantages thereof may be acquired by referring to the following description taken in conjunction with the accompanying drawings wherein.

DETAILED DESCRIPTION

Preferred embodiments and their advantages are best understood by reference to the accompanying figures and the description contained herein. The same or similar reference symbols in the different figures may be used to indicate the same or similar items.

For purposes of this disclosure, an information handling system, computer or similar device may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

As referred to herein, a component of an information handling system may assume a variety of forms. In one aspect, a component of an information handling system may include, but is not limited to, a single hardware device such as a hard drive, floppy disk drive, CPU, or removable media. In another aspect, a component of an information handling system may include, but is not limited to, a single software module such as the software pertaining to data protection, system virtual memory or display management. Further, a component of an information handling system may include a plurality of hardware devices, a plurality of software modules, or a combination of hardware devices and software modules.

Teachings of the present invention, in one embodiment, are designed to protect a heterogeneous mobile computing environment comprised of notebooks, tablet PCs, PDAs and smartphones from a wide variety of manufacturers using varied operating systems, including, without limitation, Windows®, Palm®, Windows Mobile®, RIM BlackBerry®, Symbian™ and others. The description that follows is primarily directed to securing vital information stored on notebooks, tablet PCs and desktops. However, the following description is not intended to limit the scope of the present invention.

Figure 1:
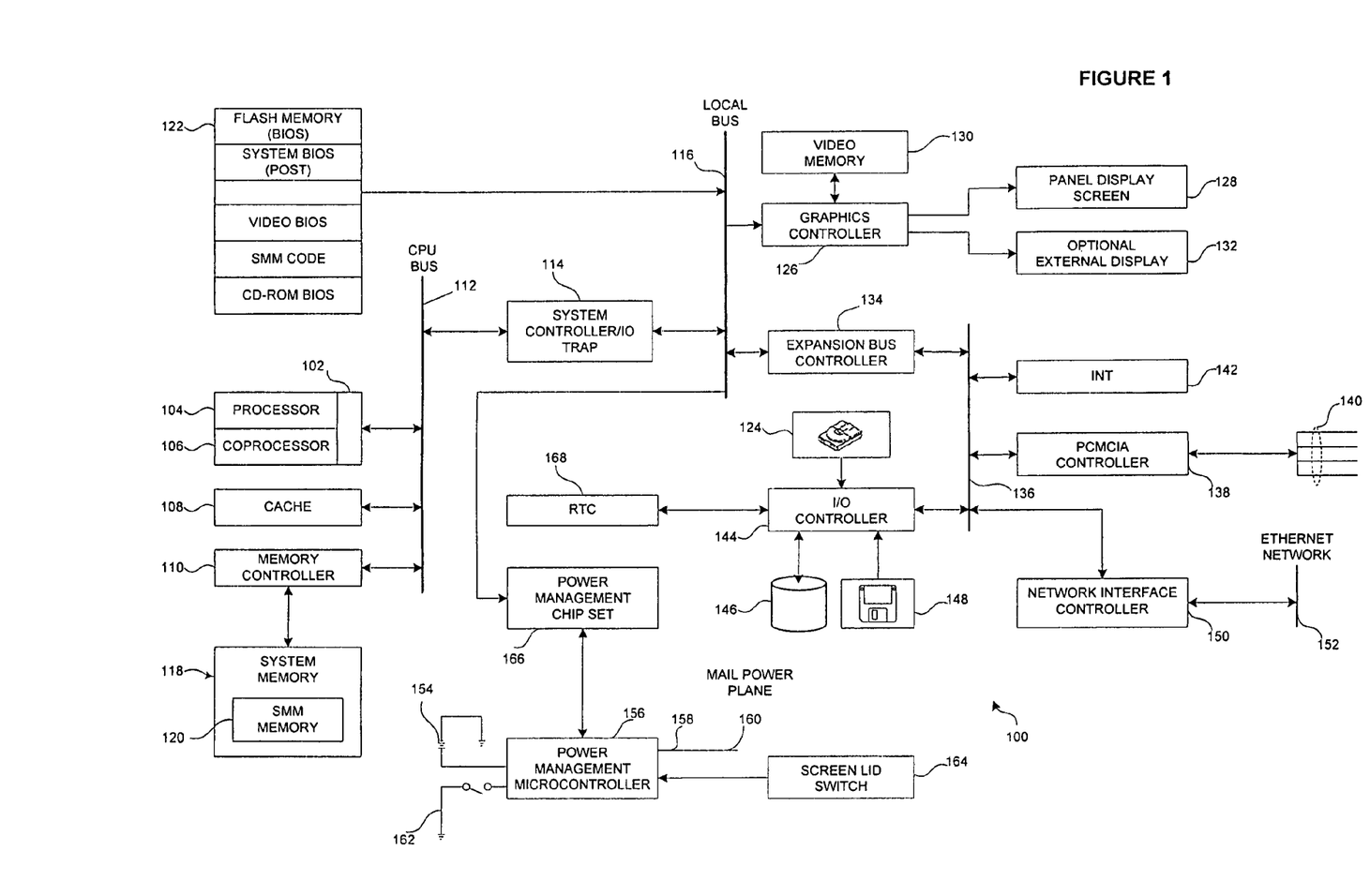
FIG. 1 is a block diagram, illustrating one embodiment of an information handling system according to teachings of the present invention.

Referring first to FIG. 1, a block diagram of an information handling system is shown, according to teachings of the present invention. Information handling system or computer system 100 preferably includes at least one microprocessor or central processing unit (CPU) 102. CPU 102 may include processor 104 for handling integer operations and coprocessor 106 for handling floating point operations. CPU 102 is preferably coupled to cache 108 and memory controller 110 via CPU bus 112. System controller I/O trap 114 preferably couples CPU bus 112 to local bus 116 and may be generally characterized as part of a system controller.

Main memory 118, dynamic random access memory (DRAM) modules, for example, is preferably coupled to CPU bus 112 by a memory controller 110. Main memory 118 may be divided into one or more areas such as system management mode (SMM) memory area 120.

Basic input/output system (BIOS) memory 122 is also preferably coupled to local bus 116. FLASH memory or other nonvolatile memory may be used as BIOS memory 122. A BIOS program (not expressly shown) is typically stored in BIOS memory 122. The BIOS program preferably includes software which facilitates interaction with and between information handling system 100 boot devices including, but not limited to, a keyboard (not expressly shown), mouse (not expressly shown), or CD-ROM 124. BIOS memory 122 may also store system code operable to control a plurality of basic information handling system 100 operations.

Graphics controller 126 is preferably coupled to local bus 116 and to panel display screen 128. Graphics controller 126 may also be coupled to a video memory 130 operable to store information to be displayed on panel display 128. Panel display 128 is preferably an active matrix or passive matrix liquid crystal display (LCD). However, other display technologies may be employed. In selected applications, uses or instances, graphics controller 126 may also be coupled to an optional, external display or standalone monitor display 132.

Bus interface controller or expansion bus controller 134 preferably couples local bus 116 to expansion bus 136. In one embodiment, expansion bus 136 may be configured as an Industry Standard Architecture ("ISA") bus. Other buses, for example, a Peripheral Component Interconnect ("PCI"), PCI-Express, Universal Serial Bus (USB), FireWire®, may also be used.

Personal computer memory card international association (PCMCIA) controller 138 may also be coupled to expansion bus 136 as shown. PCMCIA controller 138 is preferably coupled to a plurality of expansion slots 140. Expansion slots 140 may be configured to receive PCMCIA expansion cards such as modems, fax cards, communications cards, or other input/output (I/O) devices as well as other components.

Interrupt request generator 142 is also preferably coupled to expansion bus 136. Interrupt request generator 142 is preferably operable to issue an interrupt service request over a predetermined interrupt request line in response to receipt of a request to issue interrupt instruction from CPU 102.

I/O controller 144, often referred to as a super I/O controller, is also preferably coupled to expansion bus 136. I/O controller 144 preferably interfaces to an integrated drive electronics (IDE) or other compatible hard disk drive 146, CD-ROM (compact disk-read only memory) or other optical media drive 124 and floppy disk or other removable media drive 148. Other disc drive devices (not expressly shown) which may be interfaced to the I/O controller include, without limitation, a removable hard drive, zip drive, CD-RW (compact disk-read/write) drive, CD-DVD (compact disk-digital versatile disk) drive, Flash memory, and USB fob drives.

Network interface controller 150 is preferably provided and enables information handling system 100 to communicate with communication network 152, e.g., an Ethernet network. Communication network 152 may include a local area network ("LAN"), wide area network ("WAN"), Internet, Intranet, wireless broadband or the like. Network interface controller 150 preferably forms a network interface for communicating with other information handling systems (not expressly shown) coupled to communication network 152. An information handling system's communication components generally include hardware as well as software components. Examples of hardware components include network interface controller 150 and communication network 152. Examples of software components include messaging services and network administration services.

As illustrated, information handling system 100 preferably includes power supply 154, which provides power to the many components and/or devices that form information handling system 100. Power supply 154 may be a rechargeable battery, such as a nickel metal hydride ("NiMH") or lithium ion battery, when information handling system 100 is embodied as a portable or notebook computer, handheld device, PDA, smartphone, etc.

Power supply 154 is preferably coupled to power management microcontroller 156. Power management microcontroller 156 preferably controls the distribution of power from power supply 154. More specifically, power management microcontroller 156 preferably includes power output 158 coupled to main power plane 160 which supplies power to CPU 102. Power management microcontroller 156 may also be coupled to a power plane (not expressly shown) operable to supply power to panel display 128.

Power management microcontroller 156 is preferably also coupled to main power switch 162, which the user actuates to turn information handling system 100 on and off. While power management microcontroller 156 powers down one or more portions or components of information handling system 100, e.g., CPU 102, panel display 128, or hard drive 146, when not in use to conserve power, power management microcontroller 156 itself is preferably substantially always coupled to a source of power, preferably power supply 154.

In a portable embodiment, information handling system 100 may also include screen lid switch 164 or indicator 164 which provides an indication of when panel display 128 is in an open position and an indication of when panel display 128 is in a closed position. It is noted that panel display 128 may be located in the same location in the lid (not expressly shown) of the computer as is typical for "clamshell" configurations of portable computers such as laptop or notebook computers. In this manner, panel display screen 128 may form an integral part of the lid of the system, which swings from an open position to permit user interaction to a closed position.

Computer system 100 may also include power management chip set 166. Power management chip set 166 is preferably coupled to CPU 102 via local bus 116 so that power management chip set 166 may receive power management and control commands from CPU 102. Power management chip set 166 is preferably connected to a plurality of individual power planes (not expressly shown) operable to supply power to respective components of information handling system 100, e.g., hard drive 146, removable media drive 148, etc. In this manner, power management chip set 166 preferably acts under the direction of CPU 102 to control the power supplied to the various power planes and components of a system.

Real-time clock (RTC) 168 may also be coupled to I/O controller 144 and power management chip set 166. Inclusion of RTC 168 permits timed events or alarms to be transmitted to power management chip set 166. Real-time clock 168 may be programmed to generate an alarm at a predetermined time as well as to perform other operations.

Figure 2:
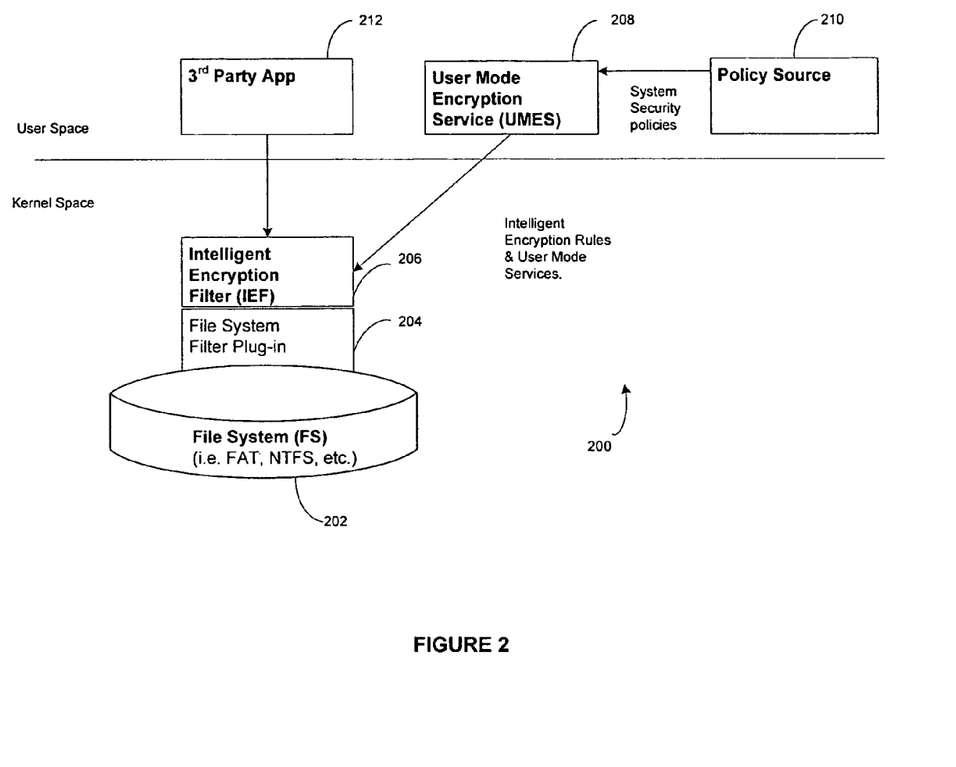
FIG. 2 is a block diagram illustrating one embodiment of a high level contextual diagram depicting a system implementing intelligence based encryption according to teachings of the present invention.

Referring now to FIG. 2, a high level contextual diagram of one embodiment of an information handling system 200 incorporating teachings of the present invention is shown. The components shown in FIG. 2, as well as certain interactions therebetween, are described in greater detail below.

As shown in FIG. 2, one embodiment of the present invention includes a file system (FS) component 202. Preferably, FS component 202 is a kernel level device operable to provide file storage, management and control in system 100 and/or 200. When teachings of the present invention are in use, data stored using FS component 202 will preferably be stored in a protected state, such as an encrypted state, according to the intelligent security rules or intelligent encryption rules specified by a system administrator or other protection policy setting body.

In addition to FS component 202, a filter plug-in mechanism 204 used by components of the invention may be incorporated into one embodiment. The Windows XP FAT32 file system is one example of such a component. Other implementations of filter plug-in mechanism 204, as well as other components of systems 100 and/or 200 as well as others, may become evident from the description provided herein.

In addition to FS component 202 and filter plug-in mechanism 204, teachings of the present invention provide an intelligent security filter (ISF), e.g., intelligent encryption filter 206. In one embodiment, ISF component 206 is a kernel level file system filter driver preferably operable to receive triggering file operations (e.g., create, delete, open, close, read, write, etc.) and apply intelligent security rules designed to implement desired protection, e.g., encryption, access control or audit logging, of file data according to one or more specified intelligent security rules. Intelligent security rules and the operation of ISF 206 are discussed in further detail below.

Teachings of the present invention further provide for a user mode security service (UMSS) component, e.g., user mode encryption service 208. According to one aspect of the present invention, UMSS component 208 may be a user level helper module operable to support ISF component 206 with the protection or encryption of files. For example, in one instantiation, UMSS component 208 may convert system security policies into intelligent security rules and supply these rules and other security parameters (e.g., keys, values to be evaluated by rules, etc.) to ISF component 206. Intelligent security rules and the operation of UMSS component 208 are discussed in further detail below.

Cooperating with the components mentioned above, in one embodiment, is a policy source component 210. According to aspects of the present invention, policy source component 210 may provide system security policies to UMSS component 208 which may then use the system security policies to generate intelligent security rules to be enforced by ISF component 206. Intelligent security rules and the operation of policy source component 210 are discussed in further detail below.

In addition to those components identified above, one embodiment of the present invention provides for the inclusion of one or more third party applications 212. According to teachings of the present invention, third party applications 212 may implement aspects of the invention by causing triggering file operations (e.g., create, delete, open, close, read, write, etc.) to occur. As these file operations occur, they are preferably detected which thereby causes the exercise of the intelligence based security provided by teachings of the present invention.

In operation, according to one embodiment of the present invention, UMSS component 208 preferably generates and maintains a list of intelligent security rules. UMSS component 208 also preferably provides one or more intelligent security rules to ISF component 206 when it needs them, e.g., upon detection of a triggering file operation, as an update, as well as in a variety of other scenarios. In one embodiment, ISF component 206 is preferably configured to apply the one or more intelligent security rules, preferably in real-time, responsive to detected triggering file operations, in order to protect or encrypt selected data. These and other aspects of one embodiment of teachings of the present invention are described in greater detail below.

According to teachings of the present invention, a system is provided which uses an intelligence-based protection and/or encryption process that enables a security administrator to easily define rules governing the inclusion and exclusion of partitions, folders, files, file extensions or other divisions of information. According to teachings of the present invention, an inclusion and/or exclusion list may be created allowing administrators to define partitions, folders, files, file extensions, applications or other divisions of information that contain or do not contain sensitive data and need or do not need to be protected or encrypted. For example, an 'inclusion list' may identify as desirous of or needing one or more protective measures on data maintained in 'My Documents,' Temporary Files, Temporary Internet Files and/or Outlook Personal folders; on entire partitions, e.g., C:\, D:\, etc.; or that all .doc, .xls, .ppt, .pdf or other application-specific file types; or data created by applications with certain attributes such as those owned by the user. Alternatively, an exclusion list may be defined allowing administrators to define folders, file extensions, applications, etc., that do not contain or create sensitive data and, thus, do not need to be encrypted, e.g., the Windows® system folder (e.g. C:\Windows), program files folder (e.g. C:\Program Files), or all the .bat, .cab, .chm, .com, .dll, .exe, .hlp, .ico, .ini, .inf, .ocx, .sys file types in directories specified for protection or encryption. The preferred combination of centrally-specified file, folder and file type protection or encryption inclusion and/or exclusion enables intelligence-based encryption such that all sensitive information may be secured and all non-sensitive data is properly maintained, regardless of where it is stored on an information handling system. Both user information and shared information may be protected and/or encrypted by a system incorporating teachings of the present invention.

According to one embodiment of the present invention, shared data may be protected or encrypted and shared between multiple users on a machine using a common protection or encryption security policy, e.g., sharing an entire partition (e.g., D:\) between all users that have Windows® login privileges to the PC, share a folder and all subfolders (e.g., C:\Shared Data), etc. In the same or an alternate embodiment, data can be protected or encrypted for each individual user using a user-specific protection or encryption security policy, e.g., protecting or encrypting a user's 'My Documents,' 'Outlook Personal Folders,' 'Temporary Internet Files,' 'Temporary Files' folders, etc.

Figure 3:
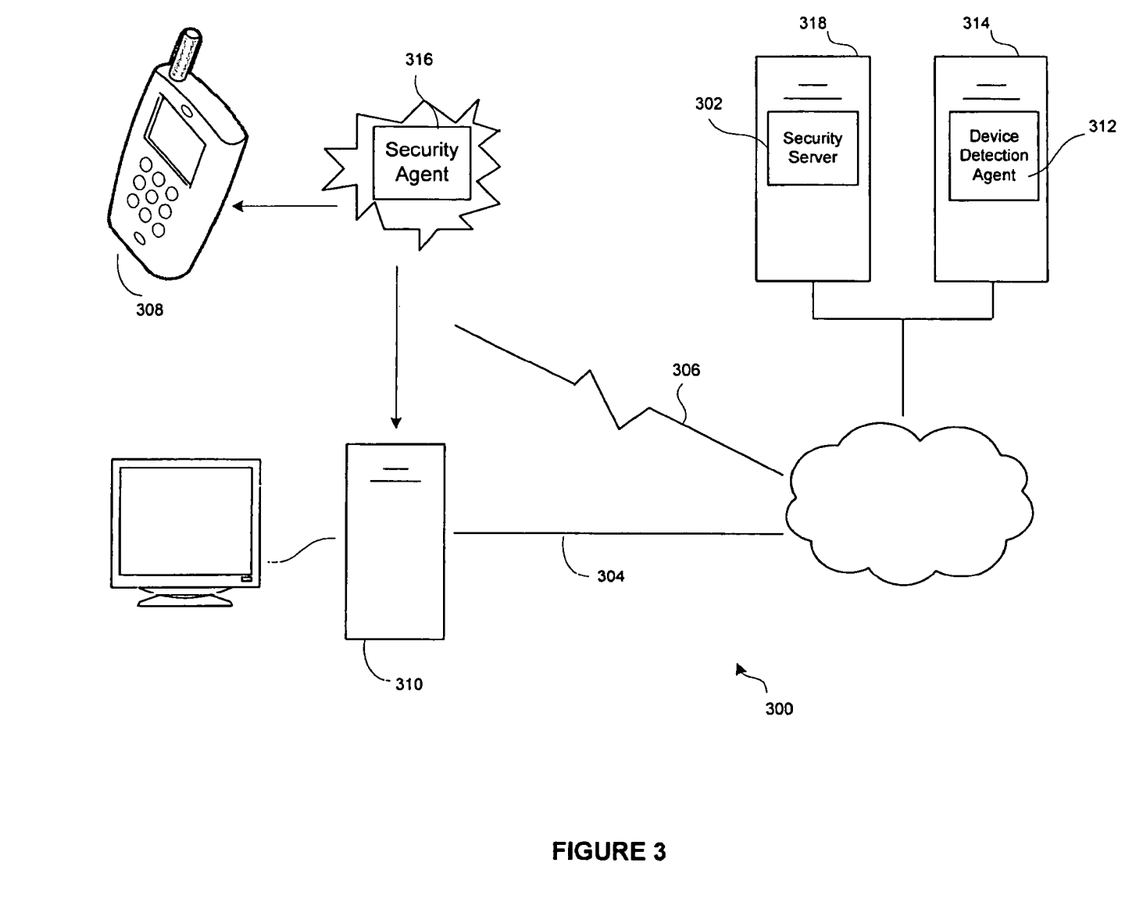
FIG. 3 is a block diagram illustrating another aspect of a system incorporating teachings of the present invention.

Referring now to FIG. 3, one implementation of intelligence-based device protection or encryption system 300 may contain a security server (SS) 302 connected by a wired 304 or wireless network 306 to one or more devices or information handling systems 308 and 310. In addition, an optional device detection agent 312 running on a network machine 314 may be provided. Further, a security agent (SA) 316 operable to that receive protection or encryption policies from SS 302 and report status information to SS 302 may also be provided. SA 316 is preferably configured to enforce protection or encryption on the one or more devices 308 and/or 310.

In one embodiment, SS 302 may be installed on centralized server hardware 318 which has occasional network access to the devices to be protected. Network access between SS 302 and device 308 and/or 310 may be required in order to initially activate a device and to provide policy updates to the device. There is generally no need for a continuous connection because once the security policies have been communicated to the device, they are enforced locally without any need for further communication to SS 302.

Following installation of SS 302, information is preferably loaded into the server from an external corporate user and machine information data repository or directory (not expressly shown). SS 302 may be configured to import the desired information about users and machines using LDAP or other means. Once imported, this information may become the basis for managing security policies on a user, group, machine or other basis. Once the preferred security policies are saved and published they preferably become available to SA 316 and device detection agent 312.

As mentioned above, an optional device detection agent (DDA) 312 may also be included. DDA 312 preferably monitors for the presence of a device 308 and/or 310 on the network or host in which it is installed and enforces the security policies it is assigned by SS 302. In one implementation, these policies might require DDA 312 to deploy SA 316 onto device 308 and/or 310.

Next, a SA 316 maybe installed on device 308 and/or 310. SA 316 may optionally replace or chain to an operating system user authentication module. Such an implementation preferably allows seamless integration with other third party user authentication systems and is especially important for integration with 2-factor authentication mechanisms. In order to fully activate SA 316, a network connection to the server maybe required to register the device and current user with SS 302 and to deliver encryption keys and policies to the device. This provisioning of keys preferably makes it possible for administrators to easily recover access to a device or re-provision original keys for a particular user on a new device for that user.

To complete activation of a user on a device SA 316, the user will preferably be prompted to enter their domain credentials into the system. These credentials may then be validated against the network domain authentication server and if valid, SS 302 may send key and policy material to SA 316. SA 316 may then apply the key and policy material. This may include prompting the user to change or initially enter a PIN, password, answer to a personal question or other SA 316 configuration information as indicated by one or more preferred security policies. Once a user has completed entry of all requested SA 316 activation information, SA 316 may complete its activation. Inventory and state information maybe relayed to SS 302 during activation and subsequent policy update operations.

SA 316 may also be encountered by a user during system login. The user may be prompted to present valid credentials which result from user activation. These credentials may be used to unlock access to a device. Once a user has accessed a device, the user may access information encrypted with their personal keys or with shared encryption keys. This access preferably occurs seamlessly and generally does not require a user to re-authenticate before accessing protected or encrypted material. User authentication preferably indicates to SA 316 which security policies and keys are to be applied for the authenticated user.

An important aspect to intelligence-based device security, in one embodiment of the present invention, is real-time application of security rules specified by a system administrator. The flexibility of security rules and the events that trigger or initiate them is also an important consideration. Other important considerations include dynamic application and update of configuration and inventory information, provisioning and management of third party applications and auto-updates among system components. The information necessary to manage these considerations, including security rules, events, configuration, etc., maybe called a security policy within the system.

Some of the capabilities offered by a security rule system incorporating teachings of the present invention include, but are not limited, to, any combination of applying protection or encryption based on file type, attributes of the application creating or writing the data, the file being located in a folder on an "inclusion" list, not applying protection or encryption based upon the file being located in a folder on an "exclusion" list or attributes of the application creating or writing the data, specifying if a user specific or shared encryption key should be used, applying and configuring external media encryption rules, applying and configuring operating system protection rules, applying and configuring user authentication and access recovery mechanisms, applying and configuring device usage controls (e.g., pan the camera, IR, Bluetooth, WiFi, Cellular phone/modem, external ports, storage cards, peripherals, etc., be used), access controls, auditing of system or user behavior, applying and configuring personal firewall rules, applying and configuring rules regarding anti-virus, anti-spam and anti-spyware, and applying and configuring rules regarding the provisioning, management and integration with third party applications such as email and synchronization tools.

Once installed, SA 316 may immediately begin applying security policy. This means that once an administrator has specified a security rule concerning files of a particular type (e.g., used by the same application like Excel or Word) to be encrypted, SA 316 will preferably dynamically apply these rules in response to detection of a triggering file operation, e.g., as files are created or saved to the file system. The SA 316 file-system filter and encryption service may work together to apply these rules continuously and intelligently to ensure maximum system reliability. In particular, the SA 316 file-system filter and encryption service will preferably detect a mis-configuration of the system that might cause instability such as specifying the encryption of critical operating system files. In this case, SA 316 may intelligently select which rules to apply and disregard rules which might cause a system to fail to operate in order to ensure system stability. Other policies such as device controls, external media encryption, third party integration and configuration may be applied automatically once the user authenticates to an installed SA.

Throughout the remainder of this document intelligent encryption rule(s) is/are referred to as simply "rule(s)". A rule may be defined as a list of qualifiers and a list of attributes in one aspect of the present invention. In one aspect of the present invention, the protection attributes, e.g., encryption attributes in one embodiment, for a protected file may include the desired encryption status of 'Encrypted' or 'Unencrypted'. For files to be 'encrypted', protection or encryption attributes may include a marker identifying whether the file is to be encrypted using either a 'per device' (Common) key, a 'user device' (User) key, or a 'per user' (Shared User) key in addition to a preferred encryption or protection algorithm to be used. Alternate embodiments are contemplated within the spirit and scope of the present disclosure.

According to teachings of the present invention, qualifiers may be used to determine which rule(s) apply to a file. In one embodiment, a qualifier may be a directory pathname for a rule. In one embodiment, all rules might be based on a directory path.

In addition, a qualifier may define the scope for a rule. Generally, a rule can be defined to apply to just the files in a specified directory. In addition, a rule can be defined to apply to files in one or more subfolders under a specified directory.

Further, a qualifier may include an optional extension list for a rule. Generally, an extension list may be defined which restricts the files that match a given rule. According to teachings of the present invention, a 'not in list' qualifier is also contemplated.

In another aspect, a qualifier may include a user process identifier (Ip) for a rule. In general, a user process ID qualifier may be used to restrict the application of a rule to those processes running under the identity of a particular user. In general, attributes of the process or running application may be used to determine whether specific system operations, such as file operations, are permitted and whether such operations require protective measures of some kind (i.e. encryption, audit logging, access control, etc.) Teachings of the present invention also contemplate a 'not this user process' qualifier functionality.

In still a further aspect, a qualifier may include an override level for a rule. Preferably, multiple overlapping rules, may be defined in order to allow for user and file extension based protection or encryption within directories that are otherwise protected. In this, as well as other aspects, the present invention permits fine grain control over the protection and/or encryption policies of a system.

According to teachings of the present invention, protection or encryption attributes may be associated with a file when the file is created. Once created, in one embodiment, the protection or encryption attributes for a file may be permanently fixed, i.e., set to never change. In order to 'replace' and/or 'alter' the protection or encryption attributes associated with a file, the file for which new attributes are desired must be re-created in one embodiment of teachings of the present invention. File recreation may be achieved through a variety of means including, but not limited to, renaming the file and copying the file back to its original name. Alternate implementations of replacing or altering a file's protection or encryption attributes may also be employed in accordance with teachings of the present invention.

In operation, when a file is created, the rules list is preferably evaluated to find the 'best' match. Then, according to one aspect of the present invention, the attributes of that rule may be applied to the new file. The 'best' match, in one embodiment, may be defined as the longest directory specification that matches an extension list and process ID. Such rules list processing is preferably order independent and it is assumed that there are no duplicate matches in the list. This assumption may be enforced in UMSS component 208. Similar treatment of files responsive to other detected triggering file operations, e.g., delete, open, close, read, write, etc., is preferably implemented in one embodiment of the present invention.

One embodiment of pseudo-code for the intelligent encryption process preferably followed by ISF component 206 may be defined as follows:

```
// Find the best rule match for each override level (Qualifier #5)
for (Each rule)
    {
        if (The target pathname matches the rule pathname (Qualifier #1))
        {
            if (The target pathname satisfies the subdirectory restriction (Qualifier #2))
            {
                if (The target pathname matches the extension restriction (Qualifier #3))
                {
                    if (The target process ID matches the process ID restriction (Qualifier #4))
                    {
                        if (Pathname match length (Qualifier #1) is greater than
                            any previous match length for this override level (Qualifier #5))
                        {
                            Set the rule for this override level (Qualifier #5) to be this rule.
                        }
                    }
                }
            }
        }
    }
// Evaluate the override levels (Qualifier #5) to find the one best match
for (Each override level (Qualifier #5) from lowest to highest)
{
    if (There is a rule for this override level (Qualifier #5))
    {
        if (There is not yet an output rule)
        {
            Set the output rule to be this override rule
        }
        else
        {
            // Higher override level wins when the rule specifies decrypted
            // items or encryption that does not conflict. Lower override
            // level wins when both rules specify encrypted items
            if (This override rule specifies encryption)
            {
                if (The current output rule specifies unencrypted)
                {
                    Set the output rule to be this override rule
                }
            }
            else
            {
                Set the output rule to be this override rule
            }
        }
    }
}
```

Data access control and the encryption process may be controlled with an enhanced Windows® login process, in one embodiment. The login process preferably looks and acts like a standard Windows® login procedure, but uses a specialized approach to protect the user's Windows® password hash and encryption keys until the user successfully logs in. Upon successful login, the active user's encryption keys are preferably unlocked. Files may then be decrypted on-demand, e.g., responsive to a triggering file operation. Preferably, only the encryption keys for an active authorized user are unlocked. Since individual users have individual encryption keys, users are generally unable to access another user's private information. In this embodiment, multiple people are allowed to share the same computer or information handling system securely without sharing passwords and without having access the sensitive or private information of others. Other OS environments are contemplated by the present invention.

Windows stores a hash (a cryptographic manipulation) of the Windows password (which is used to login to the domain or machine and gain access to a disconnected information handling system) in the registry. There are known programs, such as LC 5 (formerly known as LOphtCrack), which take advantage of the stored hash to do a brute force attack of the password by generating passwords, calculating their hash, and comparing them to the hash stored in the registry. If two hashes match, the attacker knows he has obtained the correct password.

A system incorporating teachings of the present invention may protect from this type of attack by removing the hash from the registry and storing it in a secure folder protected by encryption or other means. A user may login to their device using their password which is checked by the present invention. Upon successful login to their device, the password hash may then be decrypted and is preferably placed in the registry only when needed by the OS to perform specific offline password check operations. When not needed by the OS or other system component, the password hash may then be removed and stored securely in a protected data file.

According to teachings of the present invention, this approach generally increases the security of the OS password mechanism and preferably ensures that the encrypted information stored on a device may not be compromised using tools to determine the OS password. Thus, previous hack methods no longer work because the OS password hash is preferably available only for a short period of time in the registry when a user is actually logging in, and is protected or encrypted the rest of the time.

The system and method of the present invention may also be configured to protect a paging or swap file, such as the Windows paging file, to ensure that any sensitive information contained therein is protected. In one embodiment, a unique encryption key may be generated each time the information handling system boots, and may then be used to protect the paging file for all users. The paging file is preferably encrypted when not being used, and may be decrypted on the fly when being accessed.

In a further aspect, a system and method incorporating teachings of the present invention may provide for the protection of removable media such as external hard drives, USB fobs, Zip drives, SD cards, CF cards and others. Any removable media which mounts as a drive letter can be forced to be protected or encrypted, in one embodiment. According to one embodiment of the present invention, encryption of removable media can be enforced by: partition (F:/ for example), for all users of a machine so that users could share data stored on removable media), file type, (e.g., .xls or .ppt.), etc. Such capability preferably ensures that sensitive information stored on removable media is protected at all times.

Figure 4:
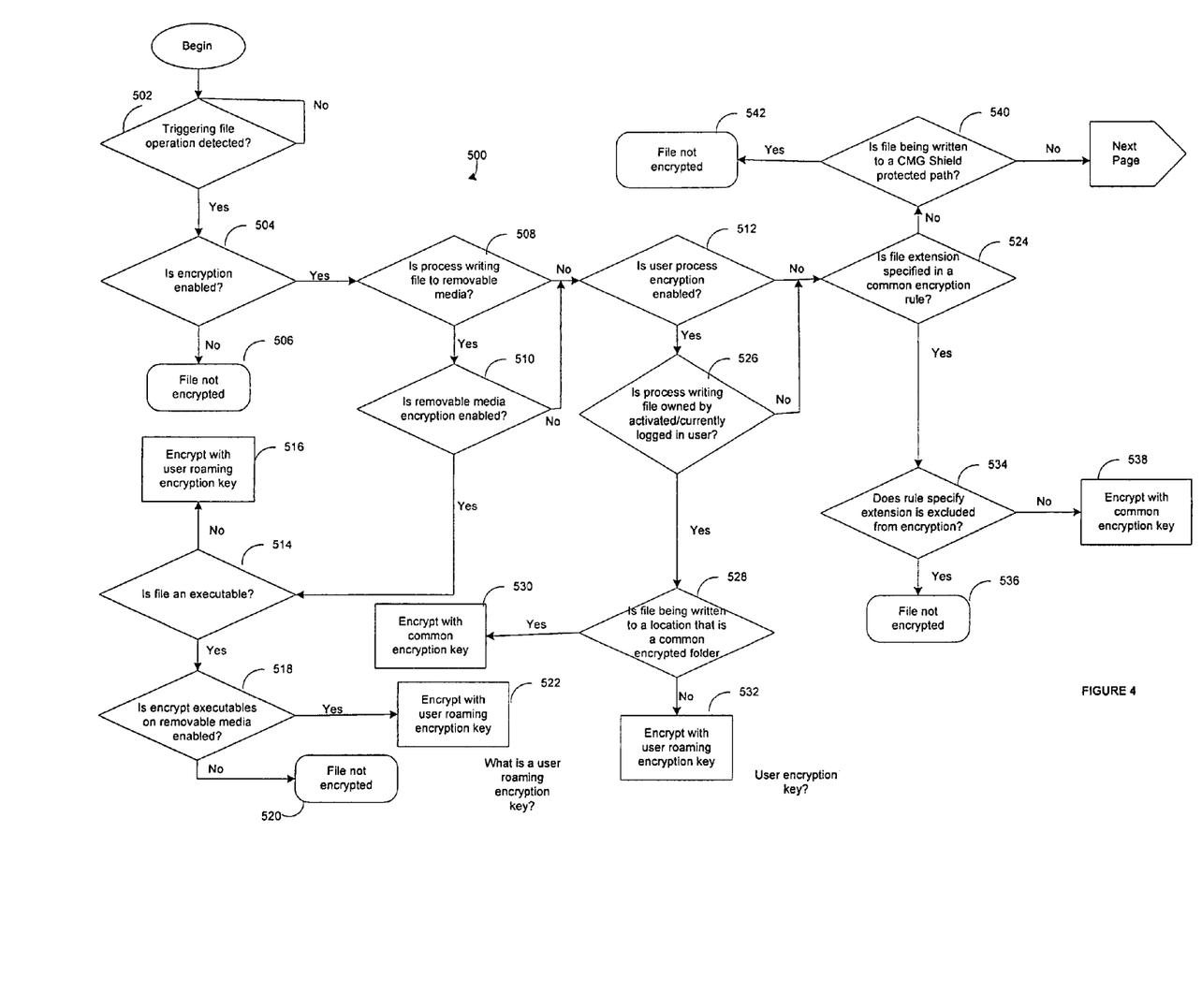
FIGS. 4-5 are flow diagrams illustrating one embodiment of a method for the intelligent encryption of data according to teachings of the present invention The present invention may be susceptible to various modifications and alternative forms. Specific embodiments of the present invention are shown by way of example in the drawings and are described herein in detail. It should be understood, however, that the description set forth herein of specific embodiments is not intended to limit the present invention to the particular forms disclosed. Rather, all modifications, alternatives and equivalents falling within the spirit and scope of the invention as defined by the appended claims are intended to be covered.
Figure 5:
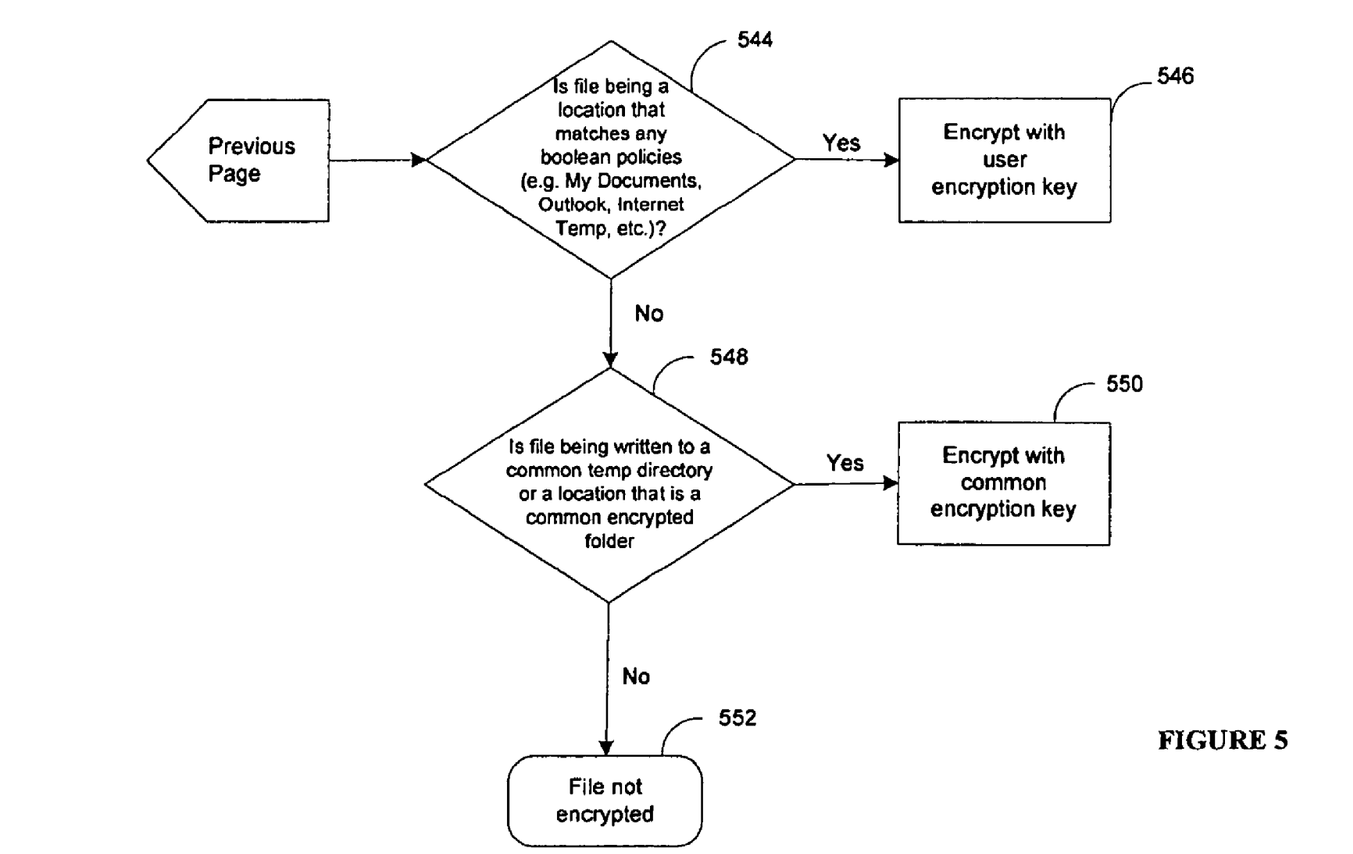

Referring now to FIGS. 4 and 5, one embodiment of a method for intelligent encryption and encryption filtering is shown according to teachings of the present invention. Various alterations, modifications and changes thereto may become evident following consideration of the description provided herein.

As shown in FIGS. 4 and 5, method 500 preferably begins at 502. After beginning at 502, method 500 preferably proceeds to 504 where detection of the occurrence of a triggering file operation may be awaited. As described above, a triggering file operation or a triggering event may include writing a file or data to storage, disk or memory, according to teachings of the present invention. In addition to data write operations as triggering file operations or triggering events, the present invention contemplates other triggering file operations or triggering events including, but not limited to, creating, deleting, opening, closing, and reading data, as well as other operations. Following recognition or detection of a triggering file operation at 504, method 500 preferably proceeds to 506.

At 506, method 500 preferably provides for an inquiry to be made to determine whether the device on which the triggering file operation was detected has encryption protection enabled. According to teachings of the present invention, one embodiment of method 500 may be implemented such that monitoring of triggering file operations is enabled while one or more data encryption applications, methods or algorithms are available, but not enabled. In response to a determination at 506 that encryption is not enabled, method 500 preferably proceeds to 508 where method 500 may end. Alternatively, in response to a determination at 506 that encryption is in fact enabled, method 500 preferably proceeds to 510.

According to one embodiment of the present invention, provision may be made for securing data maintained in storage or memory internal to a device implementing teachings of the present invention, as well as data stored or to be stored on removable media connected to a device implementing teachings of the present invention. Removable media may include, but is not limited to, USB fob memory, removable hard drive devices, flash memory, as well as other removable media devices.

Accordingly, at 510, one embodiment of method 500 provides for the protection of data stored or to be stored; temporarily or permanently, on removable media. Preferably, at 510, method 500 determines whether the triggering file operation detected at 504 concerns file operations to be performed on data stored or to be stored on removable media operably coupled to the device. If at 510 method 500 determines that the detected triggering file operation involves data operations affecting removable media, method 500 preferably proceeds to 512. If at 510 method 500 determines that the detected triggering file operation does not involve removable media data operations, method 500 preferably proceeds to 514.

At 512, settings for the current device implementing one embodiment of method 500 may be checked in order to determine whether removable media protection is enabled. If at 512 it is determined that removable media protection is not enabled, method 500 preferably proceeds to 514. Alternatively, if at 512 it is determined that the current device indeed has removable media protection enabled, method 500 preferably proceeds to 516.

According to one embodiment of the present invention, fine grain control over data to be protected is preferably available. In such an embodiment, protection for a device, as well as for the data thereon, may be implemented according to the location at which data is maintained, whether internal to the device or removable. In addition, in one embodiment, provision for data protection may be enabled based on the type of data, the path or location at which the data is stored, the application associated with a certain data type, the user logged in to the device and effecting the triggering file operations, as well as myriad other parameters.

At 516, one embodiment of method 500 preferably provides for the examination of data associated with or affected by the triggering file operation. According to one aspect of the present invention, method 500 preferably provides for a determination as to whether data associated with or affected by the triggering file operation is an executable file at 516. If at 516 it is determined that data associated with or affected by the detected triggering file operation is not an executable, method 500 preferably proceeds to 518. Alternatively, if at 516 it is determined that data associated with or affected by the triggering file operation detected at 504 is an executable file, method 500, in one embodiment, preferably proceeds to 520. In addition to checking whether data is an executable file, method 500 may determine whether the data is non-sensitive data, including, but no limited to, .bat, cab, .chm, .com, .dll, .hlp, .ico, .ini, .inf, .ocx, .sys.

At 518, in one embodiment of the present invention, method 500 preferably provides for the protection of the data associated with or affected by the triggering file operation detected at 504. According to teachings of the present invention, method 500, at 518, may encrypt the data affected by the triggering file operation using a roaming encryption key. According to teachings of the present invention, one embodiment of a roaming encryption key is an encryption key operable for use with a variety of different devices implementing teachings of the present invention. According to teachings of the present invention, data protection measures in addition to or in lieu of encryption may be provided at 518 as well as at other stages of method 500 where data is processed for security or otherwise secured.

In one embodiment of the present invention, a roaming encryption key is an encryption key that is available to a specific, individual user, regardless of the device on which it is assigned. Consequently, the key may be used to encrypt or decrypt data for that user to be shared across any devices on which that user is authenticated. In a further embodiment, the roaming encryption key provides encrypted data portability, ensuring that an end user can freely roam from one protected machine to another within the enterprise and gain access to the encrypted data protected with this key. In one aspect, a roaming encryption key is most applicable when encrypting data on removable media that can be easily detached from a fixed machine and ported with the user from one location to another.

As described above, if the data associated with or affected by the triggering file operation detected at 504 was determined to be an executable file at 516, method 500, according to one embodiment of the present invention, preferably proceeds to 520. At 520, method 500 preferably interrogates one or more device settings to determine whether the settings on the current device are configured to protect executable data stored or to be stored on removable media operably associated with the current device. If at 520 it is determined that the current device is not configured to protect executable data on removable media, method 500 preferably proceeds to 522 where the data associated or affected by the triggering file operation detected at 504 may be left unprotected. According to one embodiment of the present invention, for the triggering file operation detected at 504 during the instant iteration, method 500 may end at 522. Alternatively, method 500 may return from 522 to 504 where the next triggering file operation may be awaited.

According to one embodiment of teachings of the present invention, data may be protected according to the application or process initiating the triggering file operation. In a further embodiment of teachings of the present invention, data may be protected according to those applications or processes initiating the triggering file operation and owned or activated by an authenticated or logged-in user.

As described above, method 500 preferably provides at 510 for a determination as to whether the current triggering file operation is associated with or affects data stored or to be stored on removable media. If at 510 it is determined that the current triggering file operation is not associated with or does not affect removable media, method 500 preferably proceeds to 514. At 514, method 500 preferably interrogates or otherwise investigates settings on the current device to determine whether user process encryption is enabled. If at 514 it is determined that user process encryption is not enabled, method 500 preferably proceeds to 526. Alternatively, if at 514 it is determined that user process encryption is enabled, method 500 preferably proceeds to 528.

At 528, method 500 preferably provides for a determination as to whether the application or process responsible for the current triggering file operation detected at 504 is owned or was activated by the current, authenticated or logged-in user. If at 528 it is determined that the application or process responsible for the current triggering file operation is not owned or was not activated by the current, authenticated logged-in user, method 500 preferably proceeds to 526. Alternatively, method 500 may proceed to 530 according to teachings of the present invention.

Whether the data associated with or affected by the current triggering file operation is stored in or to be stored in a common protected folder or location, whether temporarily or permanently, is preferably determined at 530. If at 530 it is determined that the data associated with or affected by the current triggering file operation is stored or to be stored in a common protected folder or location, method 500 preferably proceeds to 532 where the data associated with or affected by the current triggering operation may be subjected to one or more protective measures such as, according to one embodiment, encryption using a common encryption key. Alternatively, method 500 proceeds to 534 where the data associated with or affected by the current triggering operation may be subjected to one or more protective measures such as, according to one embodiment, encryption using a user specific encryption key.

At 526, following a determination at 514 that user process encryption is not enabled or a determination at 528 that the application or process responsible for the current triggering file operation is not owned or was not activated by the current, logged-in, or authenticated user, method 500 preferably determines whether the current device's protection scheme includes file extension or file type protection. If at 526, it is determined that file extension or file type data protection is enabled, method 500 preferably proceeds to 536 according to one embodiment of teachings of the present invention.

At 536, in one embodiment of teachings of the present invention, method 500 preferably provides for a determination as to whether the file type or file extension associated with the current triggering file operation is excepted or excluded from the security policies of the present device. If at 536 it is determined that the file type or file extension for the data or file associated with or affected by the current triggering file operation is excepted or excluded from the security or protection policies of the current device, method 500 may proceed to 538 where the data associated with or affected by the current triggering file operation is left unprotected. Alternatively, method 500 may proceed to 540 where the data associated with or affected by the triggering file operation, may be subjected to one or more protective measures, such as encryption using a common encryption key. After either 538 or 540, method 500, in one embodiment of the present invention, may return to 504 where the next triggering file operation may be awaited.

If at 526 it is determined that the file type or file extension protection measures are not enabled on the current device, method 500 preferably proceeds to 542 in one embodiment of the present invention. At 542, a determination is preferably made as to whether the location at which the data associated with or affected by the current triggering file operation is a location at which data is to be subjected to one or more protective measures. For example, a protective measure may be implemented such that all data stored, temporarily or otherwise, at a particular location, e.g., the directory pathname C:\Windows\Desktop, is to be subjected to one or more security measures. If at 542 it is determined that the location at which the data associated with or affected by the current triggering file operation is to be stored or otherwise operated upon, method 500 preferably proceeds to 544 where the data is left unprotected and from which method 500 may return to 504 where the next triggering file operation may be awaited.

Alternatively, if at 542 it is determined that the location or path at which the data associated with or affected by the current triggering file operation is to be subjected to one or more protective measures, method 500 preferably proceeds to 546. At 546, method 500 preferably provides for a determination as to whether the data associated with or affected by the current triggering operation is associated with, e.g., stored at, a location having associated therewith one or more boolean policies. If it is determined at 546 that the data associated with or affected by the current triggering operation is associated with a location having associated therewith one or more boolean policies, method 500 preferably proceeds to 546. At 548, the data is preferably subjected to one or more protective measures, such as encryption using a user encryption key. Following operations at 548, method 500 may return to 504 where the next triggering file operation may be awaited.

In one aspect of the present invention, there may be provided a set of boolean policies that are provided for specifying automatic encryption rules for specific data on a system. These boolean policies may be provided to cover default locations on a machine where sensitive data are often stored (e.g. My Documents, Outlook Personal Folders, Temporary Files). Through the configuration of these policies administrators may enforce the automatic encryption of any data stored in these default locations with the user encryption key. Such an embodiment allows administrators to quickly and efficiently setup protection of sensitive data. In one aspect, when you "check the box" to turn on a boolean policy, encryption rule(s) may automatically be generated behind the scenes to configure the system to encrypt the item which was checked.

If at 546 it is determined that the data associated with or affected by the current triggering operation is not associated with a location having associated therewith one or more boolean policies, method 500 preferably proceeds to 550. At 550, method 500 preferably provides for a determination whether the data associated with the current triggering file operation will be stored, temporarily or otherwise, to a common temporary directory or a location subject to common protective measures, e.g., a paging or swap file. If at 550 it is determined that the data associated with the current triggering file operation will be stored to a common temporary directory or a location subject to common protective measures, method 500 preferably proceeds to 552 where the data may be subjected to one or more protective measures, such as encryption using a common encryption key. Following operations at 552, method 500 may return to 504 where the next triggering file operation may be awaited. Similarly, if at 550 it is determined that the data associated with the current triggering file operation will not be stored to a common temporary directory or a location subject to common protective measures, method 500 may proceed to 554 where the data is left unprotected before method 500 returns to 504 where the next triggering file operation may be awaited.

One embodiment of a system incorporating teachings of the present invention is preferably FEPS 140-2 validated to ensure that the implementing product is correctly performing cryptographic operations and that sensitive information is secure. In one aspect, teachings of the present invention allow implementing organizations to: reduce risk with enforced, policy-based, on-device security, including mandatory access control, stored data encryption, and data destruction capabilities; ensure compliance with regulations such as HIPAA, Gramm-Leach-Bliley, Sarbanes-Oxley, Calif. SB1386 and others; enable productivity and ease-of-use with the ability for secure recovery and password reset at all times, whether connected or not; minimize costs by integrating with existing enterprise directories such as Microsoft Active Directory and providing the ability to control security for diverse mobile devices from a single console.

Further, a system incorporating teachings of the present invention preferably protects vital information by combining information about who the user is and what they are allowed to see with information about essential files that need to be protected on notebooks, desktops, or other information handling systems. Rule-based, a system incorporating teachings of the present invention preferably protects and/or encrypts all essential information without encrypting the entire operating system, application files or other files not containing sensitive data. Unlike file-based solutions, a system incorporating teachings of the present preferably protects or encrypts data including shared data, user data, temporary files, the Windows Paging file, the Windows Password hash typically stored in the registry, and data stored on removable media as well as, potentially, other information.

Data files are preferably encrypted and decrypted transparently, on-the-fly as they are accessed by an active, preferably authorized, user. The data may be decrypted by the read process as applications such as Microsoft® Word, Excel, Power Point, Outlook, ACT! or others open and access files. The data may be encrypted by the write process as applications modify and store data. This is preferably a user-transparent model and does not require user action beyond login. In addition, the encryption and decryption is preferably transparent to all applications running on the system.

The description above is exemplary and is not intended to limit the teachings of the present invention in any manner. For example, one or more the modules describe above may be further combined and the operations distributed among a number of additional components. Further, one or more portions of the invention described herein may be implemented in hardware, software or some combination thereof.

Although the present disclosure has been described in detail, it should be understood that various changes, substitutions, and alterations can be made hereto without departing from the spirit and the scope of the invention.

What is claimed is:

1. A method for securing data, implemented in a computer system, the computer system including a tangible, non-transitory storage section, a user input device, an output device, and a processor, the method comprising:
   receiving, at the computer system, one or more parameters defining a security policy;
   dynamically generating, by executing with the processor of the computer system instructions stored in the storage section, one or more intelligent security rules based on the security policy, each rule including at least one qualifier and at least one attribute;
   maintaining the one or more intelligent security rules, by executing with the processor of the computer system instructions stored in the storage section, for use by an intelligent security filter operable to leverage the one or more intelligent security rules;
   determining whether applying the one or more intelligent security rules would cause a system misconfiguration; and
   responsive to the determining step, altering the one or more intelligent security rules to avoid the system misconfiguration.

2. The method of claim 1, wherein the attribute of each rule indicates whether data identified by the rule is to be encrypted or to remain unencrypted and, if encrypted, what type of encryption and what type of key are to be used for encryption.

3. The method of claim 1, wherein the qualifier of each rule includes a pathname, path scope, data type, file type, file system owner, file system attributes and running process attributes and owner.

4. The method of claim 1, wherein the parameters of the security policy include one or more of a pathname, path scope, data type, data ownership, category of data and active process attributes.

5. A system for securing data, comprising: at least one processor; a memory operably associated with the at least one processor; and
   a program of instructions storable in the memory and executable by the processor, the program of instructions including:
   at least one instruction operable to apply one or more security measures to data identified by one or more of: a pathname, data type, file type, file system owner, file system attributes, and running process attributes and owner, maintain the one or more security measures applicable to data while the data is not in use, and automatically remove the one or more security measures from data in response to detecting a triggering file operation requesting access to the data;
   at least one instruction operable to apply one or more security measures to data in response to detecting a triggering file operation, the one or more security measures being applied based on one or more intelligence based encryption rules, each intelligence based encryption rule including one or more of: a path at which data to be protected is stored, a scope of data to be protected stored at the path, and one or more attributes of processes required to be running for data to be protected;
   at least one instruction operable to receive one or more parameters defining a security policy, and generate the one or more intelligence based encryption rules based on the security policy;
   determining whether applying the one or more intelligent security rules would cause a system misconfiguration; and
   responsive to the determining step, altering the one or more intelligent security rules to avoid the system misconfiguration.

6. The system of claim 5, further comprising the program of instructions including at least one instruction operable to block pending file open operations until after appropriate security measures have been applied to the file.

7. The system of claim 5, wherein the intelligence based encryption rules include a type of data to be protected.

8. The system of claim 5, wherein the program of instructions is operable to apply one or more security measures to a paging file associated with one or more applications.

9. The system of claim 5, wherein the program of instructions is further operable to: store a representation of one or more user credentials in a secure location; remove one or more protective measures from the representation in response to a request seeking access to the representation; and restore the representation to a secure location when not in use by a requesting application.

10. The system of claim 9, wherein the representation includes a hash of a domain password; and where the secure location is outside a registry.

11. The system of claim 5, wherein the program of instructions includes at least one instruction operable to apply one or more security measures to data maintained on accessible removable media.

12. A method for securing data, implemented in a computer system, the computer system including a tangible, non-transitory storage section, a processor, a first set of instructions comprising an intelligent security filter, and a second set of instructions comprising a security service, the instructions being executable by the processor, the method comprising:
   receiving, at the security service, parameters defining a security policy;
   generating, at the security service, one or more intelligent security rules based on the security policy;
   detecting, at the intelligent security filter, a triggering file operation generated by an application run by or on behalf of a user;
   determining, at the intelligent security, whether any of the one or more intelligent security rules requires a security measure to be applied to data in the storage section in response to the triggering file operation;
   responsive to determining that the triggering file operation requires a security measure, applying the security measure at the intelligent security filter;
   wherein the detecting, determining, generating, and applying steps are performed without user interaction;
   wherein the security measure is applied without direction and control from the application;
   determining whether applying the one or more intelligent security rules would cause a system misconfiguration; and
   responsive to the determining step, altering the one or more intelligent security rules to avoid the system misconfiguration.

13. The method of claim 12, wherein the security measure includes one or more techniques selected from the group consisting of: encrypting data and writing the encrypted data to the storage section, decrypting data and providing the decrypted data to the application, and restricting access to data.

14. The method of claim 12, wherein the one of more intelligent security rules include at least one qualifier and at least one attribute.

15. The method of claim 14, wherein the attribute of each rule indicates whether data identified by the rule is to be encrypted or to remain unencrypted and, if encrypted, what type of encryption and what type of key are to be used for encryption.

16. The method of claim 14, wherein the qualifier of each rule includes one or more of: a pathname, path scope, data type, file type, file system owner, file system attributes and running process attributes and owner.

17. The method of claim 12, wherein at least one of the one or more intelligent security rules requires a security measure to be applied to data stored in removable media.

18. The method of claim 12, wherein the computer system further includes a network connection, and wherein at least one of the one or more intelligent security rules requires a security measure to be applied to data stored in a remote storage location that is accessed via the network connection.

19. The method of claim 12, further comprising logging security relevant file operations to the storage section based on the one or more intelligent security rules.

20. The method of claim 12, wherein the security measure includes encrypting data placed in an application-swap file with the intelligent security filter.

21. The method of claim 12, wherein the security measure includes decrypting data placed in an application-swap file with the intelligent security filter when the application-swap file is accessed by the application.

* * * * *